United States Patent
Richards

(10) Patent No.: US 11,106,051 B2
(45) Date of Patent: Aug. 31, 2021

(54) 3D PROJECTION SYSTEM USING LASER LIGHT SOURCES

(71) Applicant: DOLBY LABORATORIES LICENSING CORPORATION, San Francisco, CA (US)

(72) Inventor: Martin J. Richards, Gig Harbor, WA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 265 days.

(21) Appl. No.: 16/440,227

(22) Filed: Jun. 13, 2019

(65) Prior Publication Data

US 2019/0293952 A1 Sep. 26, 2019

Related U.S. Application Data

(63) Continuation of application No. 15/611,696, filed on Jun. 1, 2017, now Pat. No. 10,359,639, which is a
(Continued)

(51) Int. Cl.
*G02B 30/34* (2020.01)
*H04N 13/324* (2018.01)
(Continued)

(52) U.S. Cl.
CPC ............ *G02B 30/34* (2020.01); *G02B 30/23* (2020.01); *H04N 13/324* (2018.05); *H04N 13/334* (2018.05); *H04N 13/363* (2018.05)

(58) Field of Classification Search
CPC ............ A61B 1/00163; A61B 1/00193; A61B 1/00195; A61B 1/00197; G02C 7/10; G02C 7/104; G02C 7/107; G02C 7/108
See application file for complete search history.

(56) References Cited

U.S. PATENT DOCUMENTS

| 5,521,724 A | 5/1996 | Shires |
| 6,283,597 B1 | 9/2001 | Jorke |

(Continued)

FOREIGN PATENT DOCUMENTS

| CN | 101690248 | 3/2010 |
| DE | 19808264 | 11/1998 |

(Continued)

OTHER PUBLICATIONS

Hadley, L. N., et/ al.;"Reflection and Transmission Interference Filters" Journal of the Optical Society of America, vol. 37, No. 6, dated Jun. 1947, p. 451-465 (15 pgs.).

(Continued)

*Primary Examiner* — Robert E. Tallman

(57) ABSTRACT

Laser or narrow band light sources (e.g., red, green, and blue) are utilized to form left (e.g., R1, G1, B1) and right (e.g., R2, G2, B2) images of a 3D projection. Off-axis viewing of the projections which has the potential to cause crosstalk and/or loss of energy/brightness in any channel or color, is eliminated (or reduced to only highly oblique viewing angles) via the combined use of any of guard bands between light bands of adjacent channels, curvature of viewing filters, and selection of passband wavelengths that maximize usability of the passband as it "shifts" due to varying or increasing angles of off-axis viewing. Implemented with any number of light sources, the light sources selected may also be converted to showing 2D images where the additional light sources are utilized to affect a desirable increase in color gamut.

20 Claims, 11 Drawing Sheets

Related U.S. Application Data continuation of application No. 14/004,355, filed as application No. PCT/US2012/029113 on Mar. 14, 2012, now Pat. No. 9,696,558.

(60) Provisional application No. 61/452,638, filed on Mar. 14, 2011.

(51) Int. Cl.
*H04N 13/334* (2018.01)
*H04N 13/363* (2018.01)
*G02B 30/23* (2020.01)

(56) References Cited

U.S. PATENT DOCUMENTS

| | | |
|---|---|---|
| 6,698,890 B1 | 3/2004 | Jorke |
| 6,999,071 B2 | 2/2006 | Balogh |
| 7,001,021 B2 | 2/2006 | Jorke |
| 7,180,663 B2 | 2/2007 | Collender |
| 7,686,455 B2 | 3/2010 | Yoshimura |
| 7,784,938 B2 | 8/2010 | Richards |
| 7,898,603 B2 | 3/2011 | Sharp |
| 7,959,295 B2 | 6/2011 | Richards |
| 8,305,502 B2 | 11/2012 | Silverstein |
| 2007/0236809 A1 | 10/2007 | Lippey |
| 2008/0151193 A1* | 6/2008 | Reder .................. G02B 30/23 353/7 |
| 2008/0278807 A1* | 11/2008 | Richards ................ G02C 7/107 359/464 |
| 2009/0109537 A1 | 4/2009 | Bright |
| 2010/0060857 A1 | 3/2010 | Richards |
| 2011/0109820 A1 | 5/2011 | Silverstein |

FOREIGN PATENT DOCUMENTS

| | | |
|---|---|---|
| EP | 2280552 | 10/2010 |
| EP | 2357831 | 8/2011 |
| JP | 2003501680 | 1/2003 |
| JP | 2004333561 | 11/2004 |
| JP | 2005266039 | 9/2005 |
| JP | 2009526277 | 7/2009 |
| JP | 2010517075 | 5/2010 |
| JP | 2010204663 | 9/2010 |
| JP | 2010286635 | 12/2010 |
| JP | 2010537254 | 12/2010 |
| JP | 2013511066 | 3/2013 |
| WO | 2006123613 | 11/2006 |
| WO | 2008140787 | 11/2008 |
| WO | 20090114055 | 9/2009 |
| WO | 2011017062 | 2/2011 |

OTHER PUBLICATIONS

Tokunaga, Daisuke "Study on Optical Interference Filter Characteristics", Tsukuba University of Technology Techno Report, Japan, Mar. 1998, No. 5, pp. 119-122.

* cited by examiner

3D PROJECTION SYSTEM USING LASER LIGHT SOURCES

CROSS-REFERENCE TO RELATED APPLICATIONS

This application is a continuation of U.S. patent application Ser. No. 15/611,696 filed Jun. 1, 2017, which is a continuation of U.S. patent application Ser. No. 14/004,355 filed Sep. 10, 2013 (now U.S. Pat. No. 9,696,558), which is the U.S. national stage of International Patent Application No. PCT/US2012/029113 filed on Mar. 14, 2012, which in turn claims priority to U.S. Provisional Patent Application No. 61/452,638 filed on Mar. 14, 2011, each of which is incorporated herein by reference in its entirety.

BACKGROUND OF THE INVENTION

The present invention relates to display and viewing systems and more particularly to cinema systems for projecting and viewing 3D and 2D wide color gamut solutions.

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there may be a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static, and may be located in front of the projection lens or inside the projector. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventors have realized the need for narrowband projection and viewing systems in both 2D and 3D environments. In one embodiment, the present invention provides a projection system configured to project spectrally separated images from narrowband light sources for viewing through glasses having passbands wherein a central wavelength passed by each passband (or the passband itself) is red shifted relative a central wavelength of the narrowband lights the passband is intended to pass.

The present invention provides viewing glasses comprising lenses having passbands configured to pass desired lightbands off center when viewed normally such that off-axis viewing "moves" the filter to another location in the passband (e.g., "move" to center the desired wavelength). Each lens of the glasses may comprise 2 passbands configured to pass at least 3 narrowband lights, and the narrowband lights are modulated laser lights which may comprise portions of a 3D image. A first of the lenses may comprise a blue passband and a green-red passband, and a second of the lenses may comprise a blue-green passband and a red passband. The red passband may comprise a high pass filter. The desired wavelengths intended to be passed off-center when viewed normally, may be, for example, blue shifted relative a target or central or target wavelength intended to be passed by the passband.

Note that in discussions regarding aspects of the invention that wavelengths are not themselves shifted, and filters (or passbands) are not shifted nor moved. However, the terminology "shifted" is utilized to describe wavelengths relative to some reference, and the terminology "move" refers to how the filters or passband properties behave when passing light off-axis as opposed to normal.

Lenses, lens material, or filters according to the invention may be constructed from layers (e.g., layers deposited on a substrate, or layers of thin plastic, polycarbonate, or other plastic like material. In various embodiments, wavelength properties change according to location on the filters or lenses such that passbands are red-shifted toward the edges of the filters/lenses (e.g., red-shifted toward edges of the "lenses") compared to central areas of the filters/lenses.

The present invention includes energizing modulators and light sources according to image data to be displayed. The present invention is embodied as a device, method, apparatus, mechanism, or other form practicing or configured to practice any portion of the invention.

Portions of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
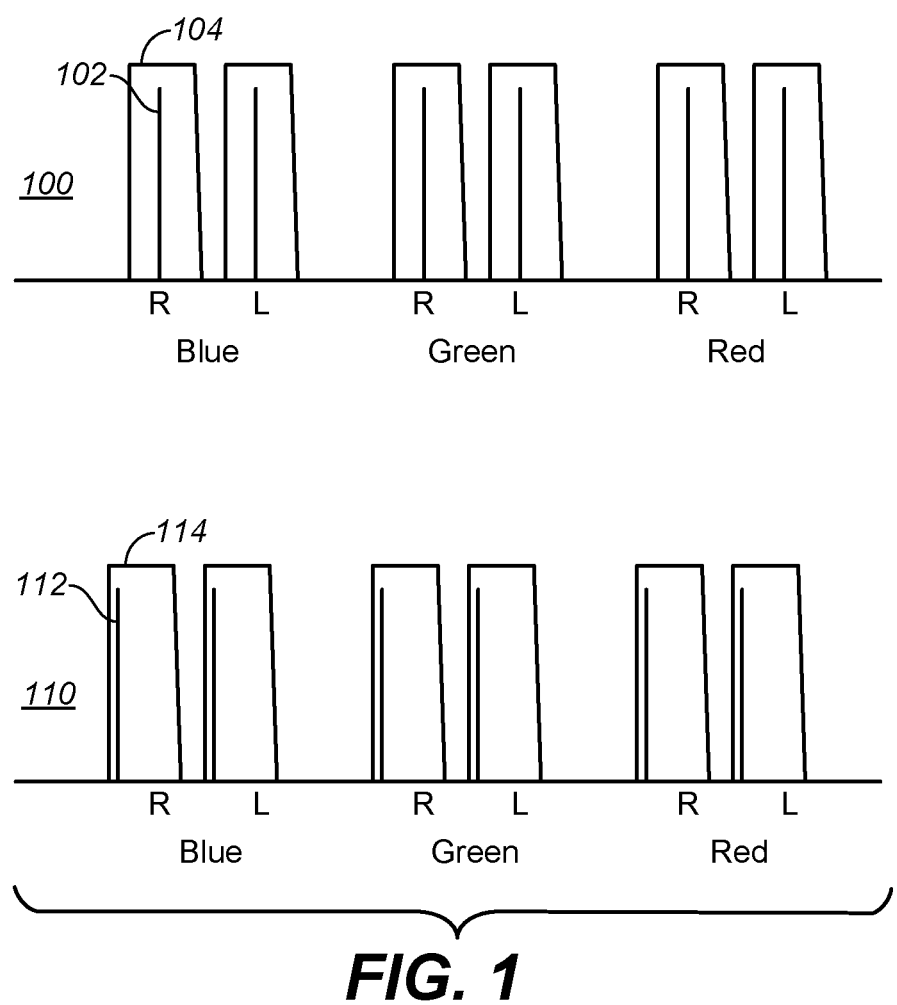
FIG. 1 is a drawing illustrating laser/narrowband lighting and viewing passbands according to embodiments of the present invention.

Referring now to the drawings, wherein like reference numerals designate identical or corresponding parts, and more particularly to FIG. 1 thereof, laser/narrowband lighting and viewing passbands according to embodiments of the present invention are illustrated. A first set of narrowband lights and passbands 100 include blue, green, and red light sources (represented by, for example, narrowband blue light 102) for each of first and second channels of a 3D image generation system. The narrowband lights are, for example, individual lasers or other narrowband light sources. The lights may be produced from a wideband light source or a series of narrower light sources coupled with appropriate filtering to match the desired bandwidth. In one embodiment, the narrowband light sources each comprise multiple closely spaced (or partially overlapping) laser lights that make a contiguous narrowband light source whose output is passed by a corresponding filter. In some embodiments, each light source is provided by a single laser.

As illustrated, the filters (represented by, for example, filter passband 104) have properties that pass one of the light sources and exclude those of the other channel. For this embodiment, each filter is specifically designed to center the filter on its corresponding light source (the light is passed at the center of the filter). An advantage of this arrangement is that filter efficiency is generally greatest at the central portion of the passband.

The channels are, for example, right (R) and left (L) channels of the 3D image generation system. And each channel has at least one blue, one green, and one red light each passed by a corresponding filter.

An improved version is provided by narrowband lights and passbands 110. As illustrated, the passbands (e.g., blue passband 114) are specifically adapted so that they pass their corresponding lights at the blue end of the filter passband. The advantage of this arrangement is that it allows for greater off-axis viewing when viewing through filters constructed with the passbands. And, with appropriately designed filters, the off-axis viewing with this arrangement can reduce or eliminate crosstalk between the channels compared to a more symmetrical design.

When viewing through filters, the filter properties vary for light viewed normally compared to light viewed off-axis. For example, passbands of the filters typically shift blue for light rays viewed off-axis (e.g., at an oblique angle of incidence with the filter) compared to light rays viewed normally (or incident perpendicular with the filter).

However, with filter construction as illustrated herein, the passbands of the filter (e.g., blue passband 114) are specifically adapted so that it passes its corresponding light at the blue end of the filter passband. This allows for a large portion of the passband to be utilized for off axis viewing compared to filter configured to straddle its corresponding light (e.g., Filter passband 104 straddling blue light 102). This will be described in greater detail with reference to FIG. 2A.

Figure 2A:
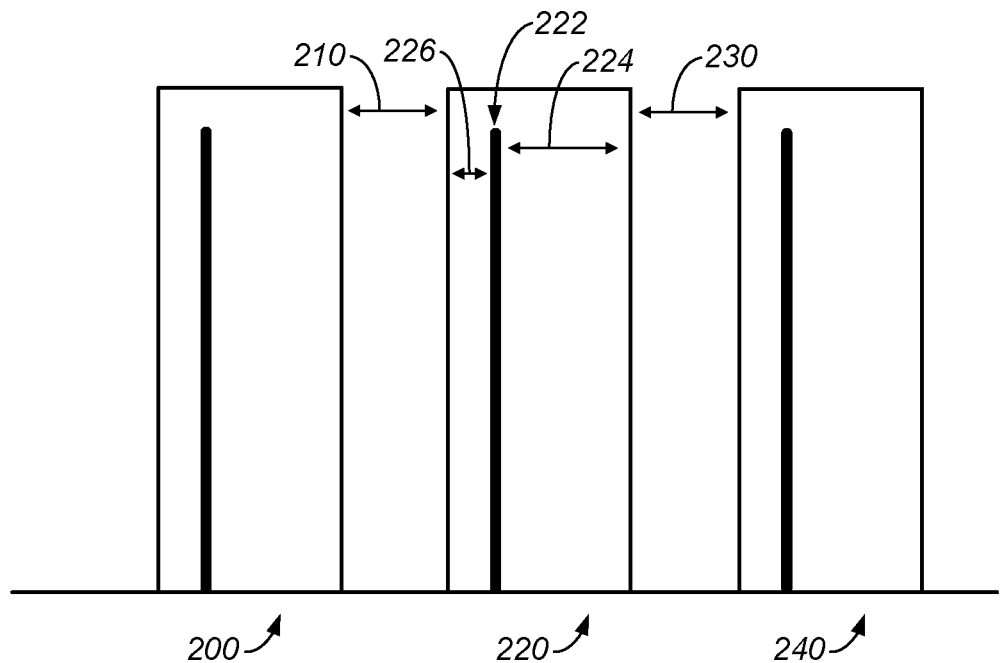
FIG. 2A is a drawing of structural elements of passbands according to embodiments of the present invention.

FIG. 2A is a drawing of structural elements of passbands according to various embodiments of the present invention. FIG. 2A illustrates 3 passbands 200, 220, and 240, and their corresponding lights to be passed. Passband 220's corresponding light 222 may comprise, for example, a laser light produced by single light source. In one embodiment, the light 222 is produced by a plurality of laser light sources of the same or only slightly varying wavelengths. The bandwidth of passband 220 is substantially larger than light 222. Passband 220 is specifically configured to pass light 222 at a blue end of the passband 220 (e.g., 1-25% of the passband).

Ideally, with high quality filter construction (e.g., vertical or near vertical passband walls, the light (when normally viewed) would be passed by the bluest portion of the passband directly adjacent to the blue passband wall. However, for a practical implementation, passband 220 includes a tolerance passband 226. In one embodiment, the tolerance passband is set to a deviation of the accuracy of the light source(s) of light 222 (e.g., peak-to-peak deviation, approximation of a peak-to-peak deviation, a standard deviation, etc.). In another embodiment, the tolerance passband is set to a deviation (or average variability) (e.g., any of peak-to-peak variability, standard deviation, etc.) of filter wall construction. In yet another embodiment, the tolerance band is set at between 1.5 and 3 nm. [+/−2 nm short wavelengths; +/−3 nm longer wavelengths] The tolerance bands may vary in width depending on wavelength. For example, shorter wavelengths may be approximately 2 nm and longer wavelengths may be approximately 3 nm.

The tolerance passband may also be set such that the light 222 is passed at the bluest point in the passband also passing a predetermined percentage of light 222. This will generally place the light 222 at the blue end of the passband but also where most of the light 222 is also passed by the passband. The predetermined percentage may be one of, for example, 70, 80 or 90 percent of light 222. In one embodiment, the tolerance passband is set such that the light 222 is passed at the bluest portion of the passband that also passes the maximum amount of light 222 that can be passed by the passband.

Figure 2B:
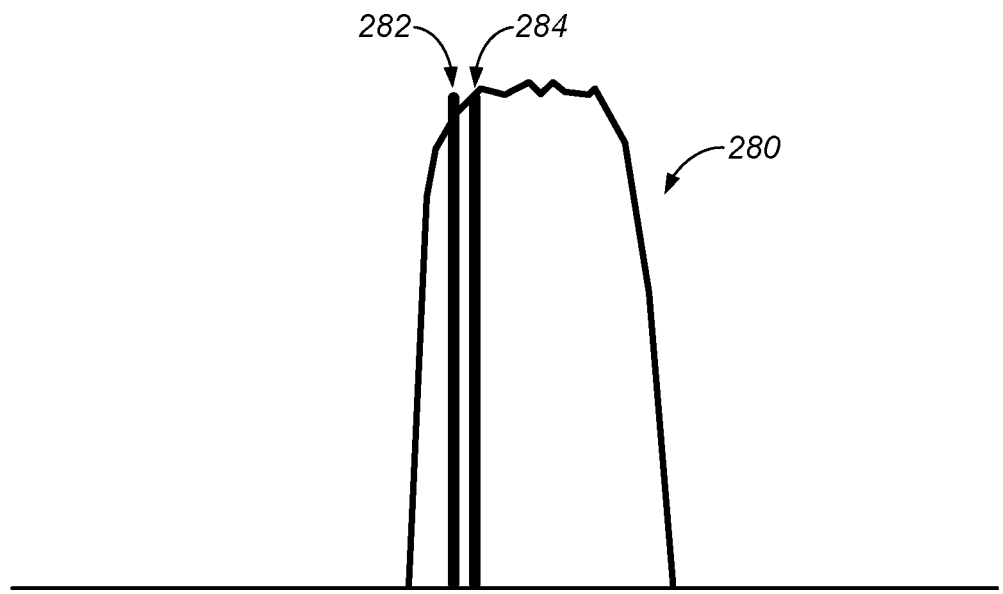
FIG. 2B illustrates a filter constructed relative to narrowband lights.

Typically, a passband filter will not have vertical walls, but sloping/uneven walls that eventually flatten out somewhat. FIG. 2B illustrates filter 280 in embodiments constructed relative to narrowband lights 282 and 284. In one embodiment the passband filter is constructed such that it passes the desired light 282 at a blue end of the passband and such that a predetermined threshold of light 282's lightband is passed by the filter. For example, the predetermined threshold may be in the range of an 80-90% transmission.

In another embodiment, the passband filter is constructed such that it passes the desired light 284 at a blue end of the passband at a first point in the filter's passband that allows a max transmission (e.g., 95%) of the light to pass. In another embodiment (not shown) the passband filter is constructed such that the desired light is passed at a first point in the filter's passband having maximum transmission of the desired light's wavelength (the first point starting from the blue end of the filter and progressing toward red).

Turning back to FIG. 2A, a filter constructed according to various embodiments of the invention may also include a shifting (or off-axis viewing) passband 224. The off-axis or shifting passband 224 comprises filter space that will be utilized when viewing the desired light (e.g., narrowband light 222) off-axis through the lens. The shifting passband passes the corresponding narrowband light when the filter properties shift due to off-axis viewing.

The size of shifting passband 224 may be calculated, for example, by determining a maximum range of off-axis viewing typically encountered in the viewing environment or at a specific venue or venue type. The max (or other predetermined off-axis) viewing angle is then utilized to calculate how much "blue shift" occurs in the filter when viewing the desired light off-axis at the max viewing angle. The shifting passband is calculated and then implemented to pass the desired wavelength when shifted an amount corresponding to filter blue shift that occurs at the max viewing angle. The max viewing angle may be, for example, a maximum designed viewing angle or an average viewing angle. The maximum designed viewing angle may occur, for example, when a cinema viewer seated at the end of a front row of a theater is looking forward but receiving and viewing light from an end of the screen opposite the viewer's seated position. The max viewing angle may also be when a viewer at a selected location views the image through the edge or corner of the lens/filter. The selected location may be a central location or a side location of the viewing venue. In addition to a selected location, an amount of head angle that would change the viewing angle may be taken into account.

The design of the passband may be specifically adapted to the max viewing angle in a manner similar to that provided for the normally viewed light as described in FIG. 2B, except as applicable to the max viewing angle and to the reddest filter wall. In such cases, the passband may be configured such that the light at the max viewing angle is passed by the filter at the last (most red) point in the passband where full transmission of the desired light at max angle is achieved. In one embodiment, a predetermined amount of the desired light at max angle is transmitted at the red end of the passband (e.g., 70, 80, or 90% transmission).

As shown in FIG. 2A, the filters also include guard bands, illustrated as guard bands 210 and 230. The guard bands are areas that do not transmit or have highly limited transmission of desired lights to reduce or prevent cross talk between channels. In one example, cross talk may occur when off-axis viewing reaches an extreme angle where a filter is blue shifted enough that light from an opposing channel is passed. The guard bands limit that possibility.

Because visible light has limited bandwidth, the number of passbands in the filter limits the size of the various bands. A filter with 3 passbands can be constructed with more generous tolerance and guard bands compared to the 5 passband filter. In various embodiments, the shifting passbands are sized to accommodate the number of passbands (giving each at least some shifting passband) capable of viewing the lights at a specified or pre-determined off-axis angle. Off-axis viewing performance, the number of passbands, and shifting area/passband size may be traded-off in the design process.

The max viewing angle and or the size of the shifting passband may be calculated based on the number of passbands to be provided in a system, and an amount of desired guard band between the passbands. For example, in a system with 6 passbands for two channels each having red, green, and blue, the size of the shifting passband is limited because there is only so much visible light that can be allocated to the passbands. Therefore, generally speaking, given a similar filter structure, more desired illumination bands in a system generally requires passbands that are smaller. Hence, bandwidth of the shifting passband may be governed by the size of the desired tolerance and guard bands.

Figure 3:
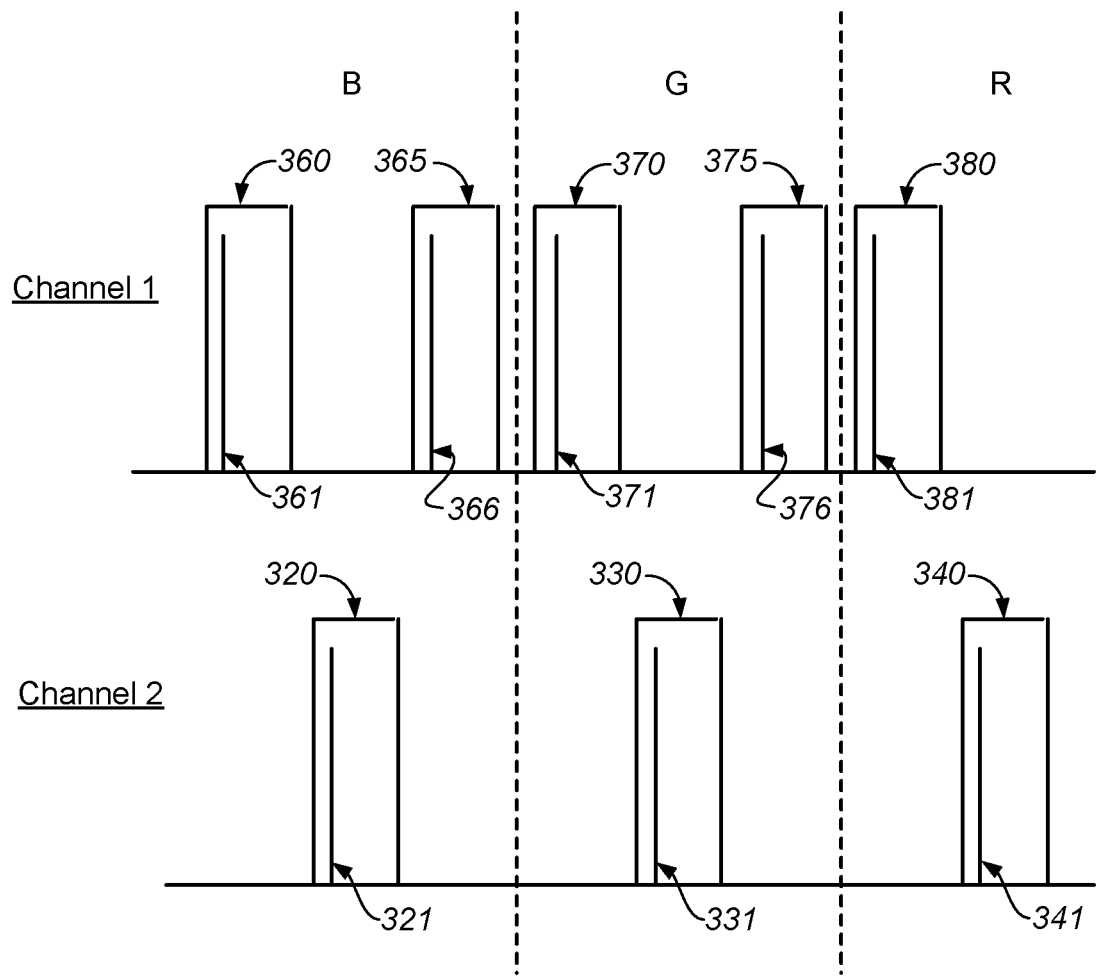
FIG. 3 is a drawing illustrating laser/narrowband lighting and viewing passbands according to embodiments of the present invention.

FIG. 3 is a drawing illustrating laser/narrowband lighting and viewing passbands according to embodiments of the present invention. A first channel 310 comprises multiple passbands including blue passband 320 (and corresponding light 321), green passband 330 (and corresponding light 331), and red passband 340 (and corresponding light 341). A second channel 350 comprises multiple passbands including a 1st blue passband 360 and 2nd blue passband 365 (and corresponding lights 361 and 366), 1st green passband 370 and 2nd green passband 375 (and corresponding lights 371 and 376), and a red passband 380 (and corresponding light 381).

The 2nd passbands of blue and green in the second channel may be utilized, for example, to correct colors in images produced by each channel. The correction may be, for example to match colors in areas of the images produced in channel 2 to colors in corresponding areas in images produced in channel 1. Additional passbands may also be utilized in the red color space. Additional 2nd color passbands may also be provided in the 1st channel and images produced by both channels may be corrected or altered to cause color matching or another desired result.

Figure 4A:
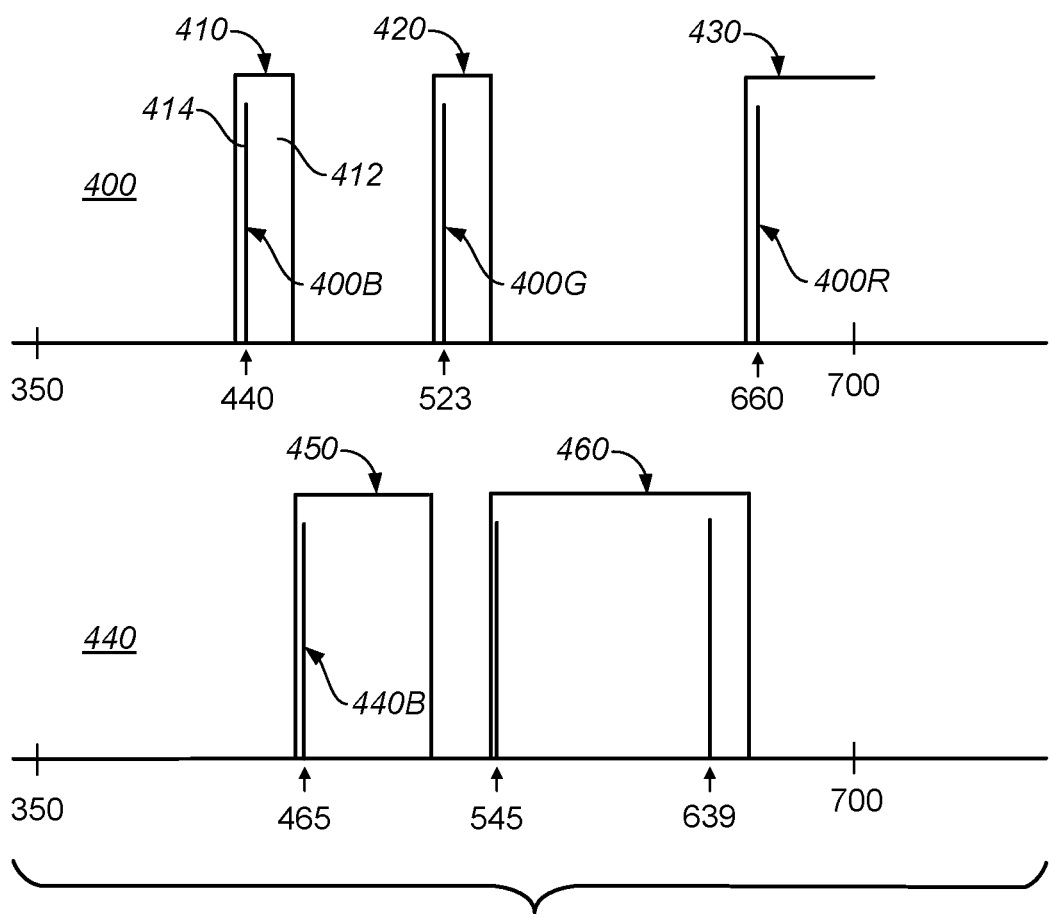
FIG. 4A is a drawing illustrating laser/narrowband lighting and viewing passbands according to embodiments of the present invention.

FIG. 4A is a drawing illustrating laser/narrowband lighting and viewing passbands according to embodiments of the present invention. A first channel 400 comprises red, green, and blue lights. The blue light 400-B may be, for example, a laser light source of 440 nm wavelength. The green light 400-G may be, for example, a laser light source of 523 nm. The red light source may be, for example, a laser light source of 660 nm.

A blue passband 410 is specifically configured to pass blue light 400-B at a blue end of the passband 410. The blue passband 410 may be configured to include a shifting passband 412 and a tolerance passband 414. The shifting passband is configured, for example, to allow off-axis viewing of blue light 400-B through a filter having passband 410. A green passband 420 is similarly constructed for green wavelengths and used in a filter that allows off-axis viewing of green light 400-G. A red "passband" 430 may be constructed as a long wavelength pass filter. Note that in the context of this discussion, the long wavelength pass filter may be referred to as a high pass filter—passing all wavelengths longer than a designated wavelength or color, while the low pass filter passes all wavelengths shorter than a designated wavelength or color (short wavelength pass filter). A pass filter is a filter constructed as having a starting point (a designated wavelength or color) at a "closed end" of the filter, and an "open end." The "open end" meaning all wavelengths beyond the designated wavelength/starting point are passed (i.e., longer wavelengths for a high pass filter and shorter wavelengths for a low pass filter).

Each of the passbands allow for passing of corresponding lights of the same channel to pass while rejecting lights of the opposite channel. A high pass filter construction in the case of red light in this channel 400 is acceptable because there is no light at higher wavelengths in the opposite channel, thus crosstalk is eliminated without the need to construct an additional filter wall (also reducing cost). The high pass configuration also maximizes the size of the shifting passband. The red "passband" in this example is, for example, a maximum shifting passband, open ended passband, open ended shifting passband, or high pass filter.

In one embodiment, the blue passband 414 may also be constructed with an open-ended passband, a low-pass filter. In such an example, resulting glasses, or a filter, may be described as having a high pass red, low pass blue surrounding a green bandpass filter. The opposite channel (or second filter) having red, green, and blue lights passed by passband filters, which may be, for example, 2 passbands passing three different color lights (e.g., the two passbands surrounding the green passband of the opposite channel).

The second channel 440 includes passband 450 configured to pass blue light 440-B which may be, for example, a blue laser light of wavelength 465. Passband 450 is specifically configured to pass blue light 440-B at a blue end of the passband 450, and include tolerance and shifting passbands.

The second channel 440 also includes passband 460 which is specifically configured to pass multiple lights (e.g., green and red lights). The passband 460 may include shifting passbands for viewing the light off-axis through a filter constructed using the passband 460. The passband 460 may be adjacent to an open-ended passband (e.g., high pass filter) in an opposite channel.

A filter system utilizing the passbands of FIG. 4A may be described, for example as a filter system having 2 channels, a first channel having open ended passbands at opposite ends of the spectrum and an enclosed passband channel, and a second channel having only enclosed passbands. In one embodiment, the invention comprises a filter system having a passband for two different color lights including shifting passbands for off-axis viewing of each light in one channel adjacent to a high pass filter in another channel.

Figure 4B:
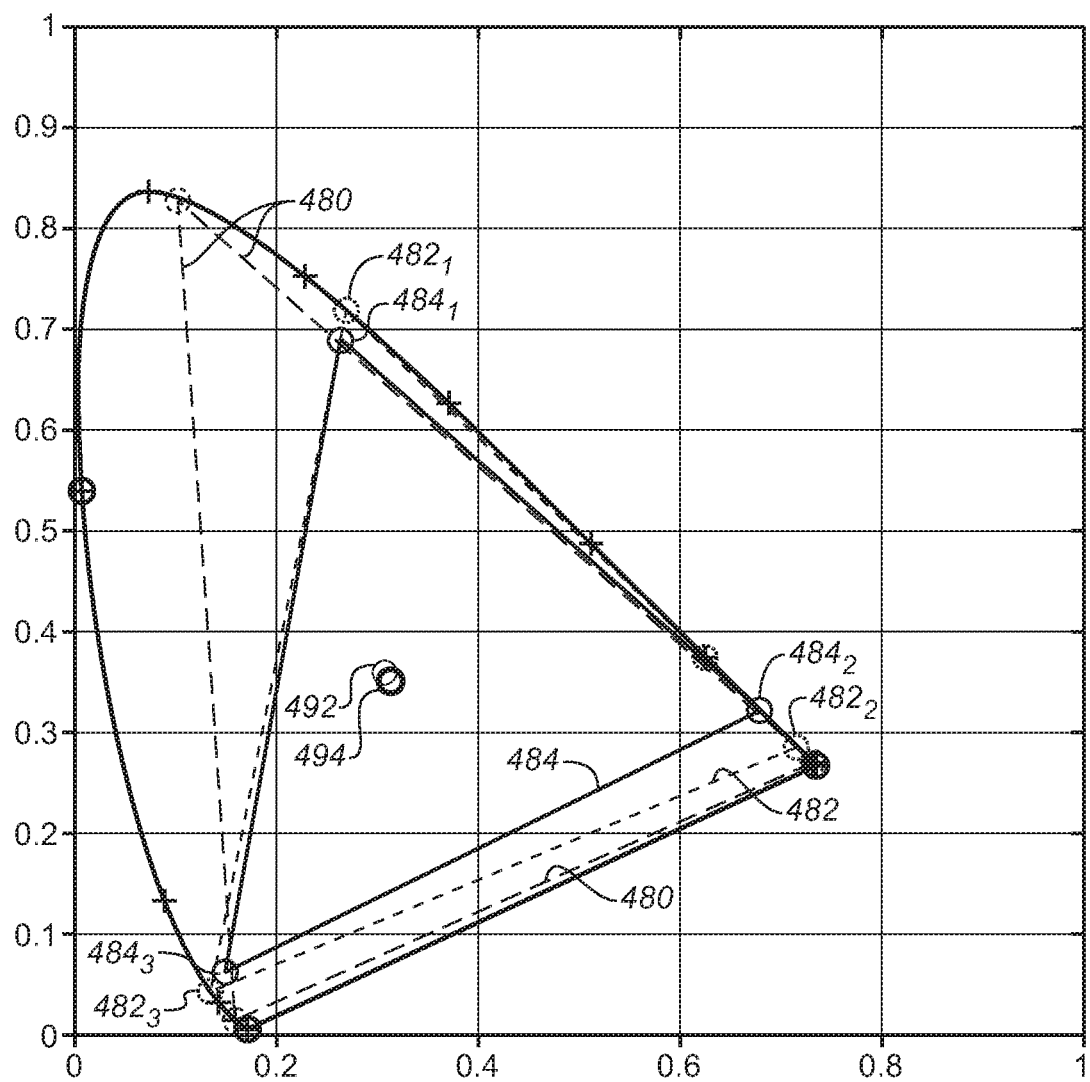
FIG. 4B is a chromaticity diagram according to the lighting and passbands provided in FIG. 4A.

FIG. 4B is a chromaticity diagram according to the lighting and passbands provided in FIG. 4A. Three triangles are shown. A first triangle 480 is a color space provided by the first channel 400. A second triangle 482 is a color space provided by the second channel 440. A third triangle 484 is the P3 color space and is close to the intersection of the first and second triangles which represent the reproducible color spaces common to both channels of a 3D system using filters according to FIG. 4A.

The first and second triangles are produced from the designation of specific wavelengths for the light sources illustrated in FIG. 4A. The wavelengths are provided in this example with an intended design so that the intersection of the first and second triangles closely approximates the P3 color space. The P3 color space is shown as triangle 486 and provided for reference. In addition, the provided wavelengths produce a white point 492, that is the wavelengths and relative amplitudes of the source light may be specifically provided or chosen so that the resulting white point 492 closely approximates the P3 white point 494. The color space of the triangles and white point are maintained during off-axis viewing through, for example, the shift passband/areas or other mechanisms also described herein.

Figure 5A:
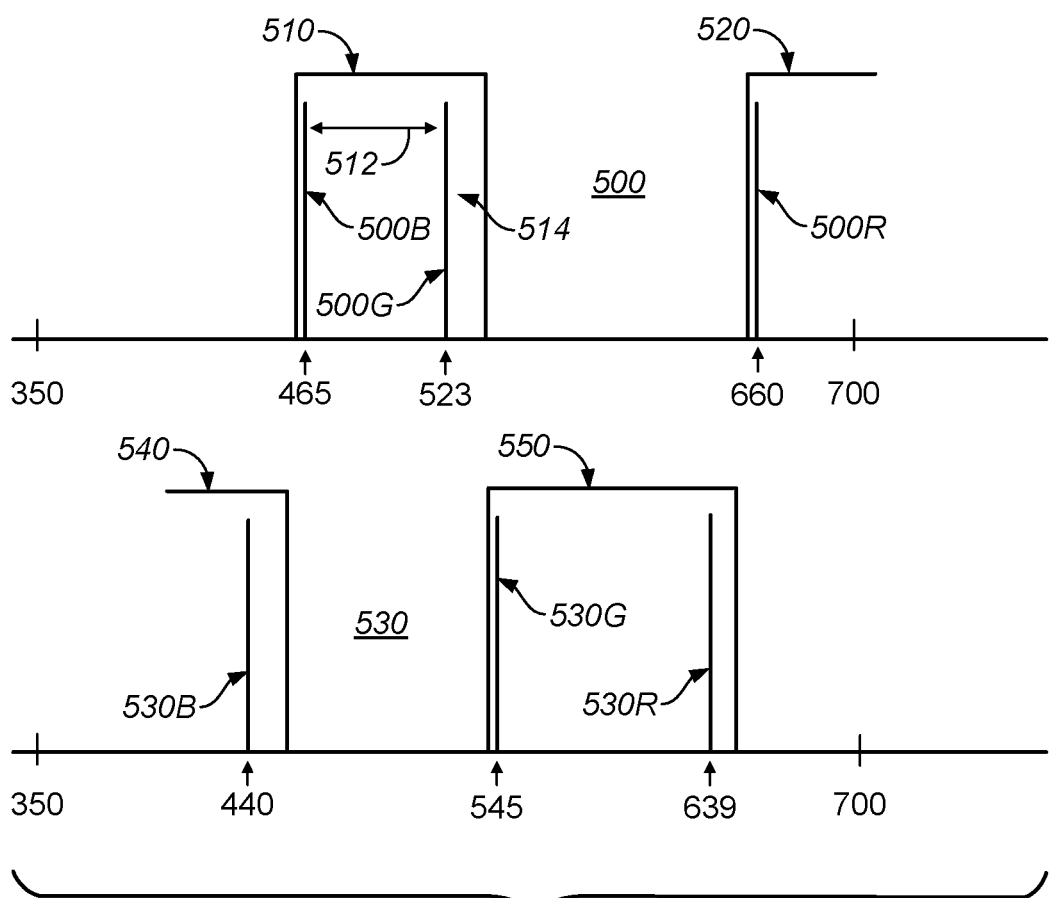
FIG. 5A is a drawing illustrating laser/narrowband lighting and viewing passbands according to embodiments of the present invention.

FIG. 5A is a drawing illustrating laser/narrowband lighting and viewing passbands according to embodiments of the present invention. A first channel 500 comprises pass areas that may be utilized in a filter for passing blue light 500-B (e.g., 465 nm), green light 500-G (e.g., 523 nm), and red light 500-R (e.g., 660 nm). A first area of the first channel comprises passband 510 which is specifically configured to pass both the blue and green lights 500-B and 500-G with separate shifting passband areas (e.g., shift bands 512 and 514) contained within the same passband. Both shift band areas are sufficient for off-axis viewing of the blue and green lights at angles normally encountered at a venue where images created using those lights are produced. The passband 510 is also sufficiently small and/or guarded such that the same off-axis incident/viewing of lights from 2nd channel 530 are blocked.

A second pass 520 area of the first channel is specifically configured to pass red light 500-R and have a sufficient shift pass area for viewing red light 500-R off-axis. In the illustrated embodiment, the second pass area 520 is an open-ended filter of the high pass variety. The shifting passband is itself an open-ended mechanism beginning adjacent to the wavelength of red light intended to be passed by the filter and continuing toward the open end of the filter.

The tolerance passband is between the wavelength of red light intended to be passed by the filter and the closed end of the high pass filter.

A second channel 530 comprises pass areas that may be utilized in a filter for passing blue light 530-B (e.g., 440 nm), green light 530-G (e.g., 545 nm), and red light 530-R (e.g., 639 nm). A first pass area 540 of the second channel is specifically configured to pass blue light 530-B and have a sufficient shift pass area (shifting passband) for viewing light 530-B off-axis. In the illustrated embodiment, the first pass area 540 is an open-ended filter of the low pass variety. The shift band is located between the wavelength of blue light and the closed end of the low pass filter. The tolerance passband in this embodiment provides an open ended mechanism starting adjacent the wavelength of blue light intended to be passed and continuing out toward the open end of the low pass filter.

A second area of the second channel comprises passband 550 which is specifically configured to pass both the green and red lights 530-G and 530-R with separate shifting passband areas contained within the same passband. Both shifting passband areas are sufficient for off-axis viewing of the blue and green lights at angles normally encountered at a venue where images created using those lights are produced. The passband 550 is also sufficiently small and/or guarded that the same off-axis viewing of lights from 1st channel 500 are blocked.

Some compromises have been made due to the availability of light sources. In the example of FIG. 5A, a 625 nm light source replacing the 639 nm light source would better optimize the available shifting bands.

The embodiment of FIG. 5A may be utilized for example in a 3D system where a right eye (or right channel) image is produced using blue light 500-B, green light 500-G, and red light 500-R, and a left eye (or left channel) image is produced using blue light 530-B, green light 530-G, and red light 530-R. Viewing filters for the left eye (or channel) and right eye (or channel) are placed, for example, at corresponding lens positions on eye glass frames.

In this embodiment, the filter of each eye has passbands that approximate or correspond to the corresponding channel's pass areas as shown in FIG. 5A (e.g., a right eye filter includes passbands of or similar to 500, and a left eye filter includes passbands of or similar to 530). The result is a filter set having an open-ended filter at one end of the visible spectrum in a first channel (e.g., the first eye filter) and an open ended filter at an opposite end of the visible spectrum in the second channel (e.g., the second eye filter). Both open ended filters pass single but different colors of light. Both channels contain a single passband area that passes two different colors of light. Both of the single passbands pass a same color light. In this example, both of the single passbands pass green light. Although exemplary embodiments such as FIG. 5A show specific bands for the right and left channels, those channels may be reversed (bands 510 and 520 may be utilized as left channel bands, and bands 540 and 550 may be utilized as right channel bands).

The illustrated embodiment may be further described as a 3D system where both channels have open-ended pass areas at opposite ends of the visible spectrum and both channels have passbands that pass green light. One of the passbands passes green light and blue light and the other passband passes green light and red light.

Figure 5B:
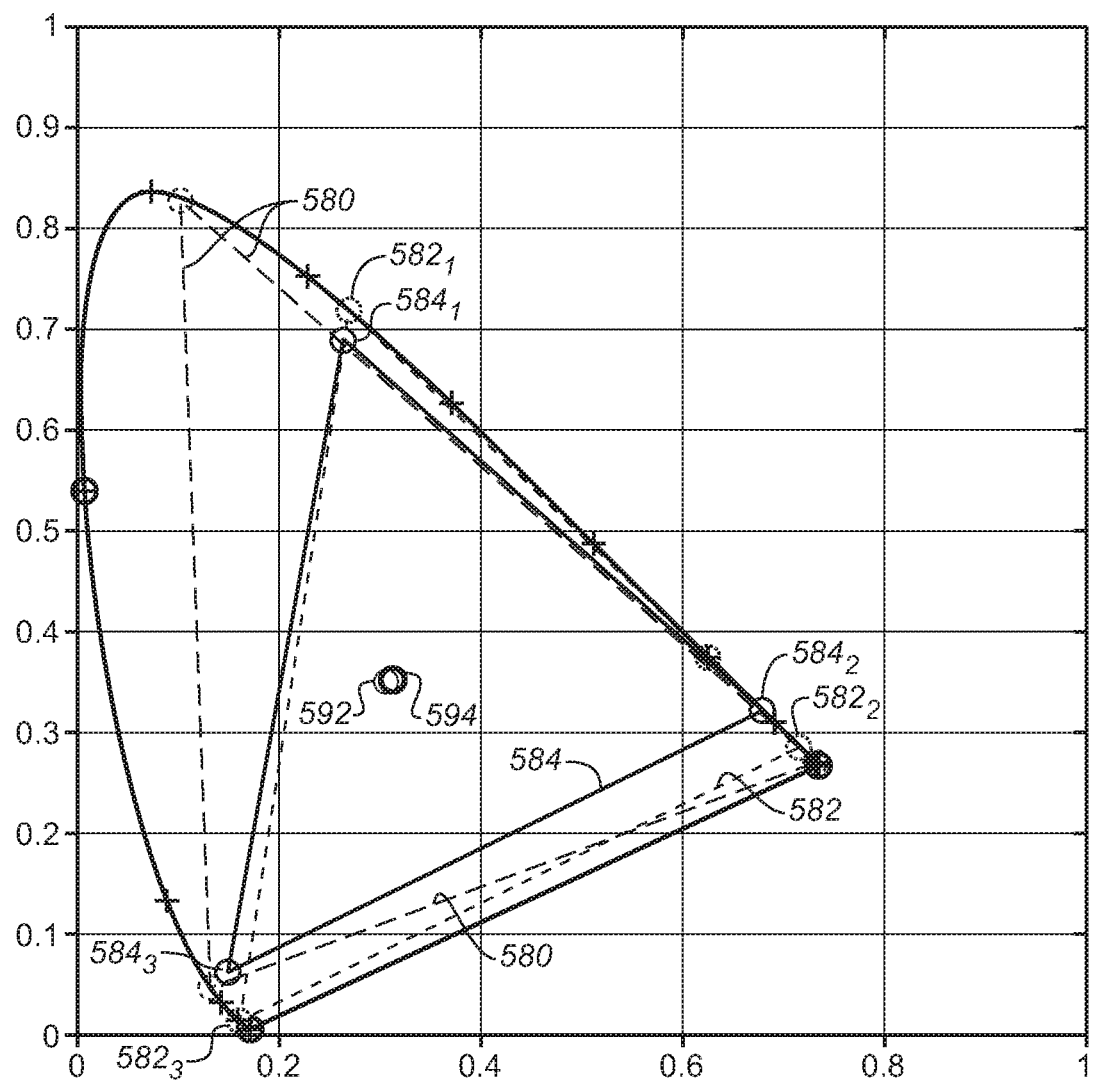
FIG. 5B is a chromaticity diagram according to the lighting and passbands provided in FIG. 5A.

FIG. 5B is a chromacity diagram according to the lighting and passbands provided in FIG. 5A. Three triangles are shown. A first triangle 580 is a color space provided by the first channel 500. A second triangle 582 is a color space provided by the second channel 530. A third triangle 584 represents the P3 color space and is close to the intersection of the first and second triangles which illustrate the reproducible color space common to both channels of a 3D system using filters according to FIG. 5A.

The first and second triangles are produced from the designation of specific wavelengths for the light sources illustrated in FIG. 5A. The triangles maintain their color space at off-axis viewing through the shift bands of the filters. The wavelengths are provided in this example with an intended design so that the intersection of the first and second triangles closely approximates the P3 color space. The P3 color space is shown as triangle 586 and provided for reference. In addition, the provided wavelengths produce a white point 592, that is the wavelengths and relative amplitudes of the source light may be specifically provided or chosen so that the resulting white point 592 closely approximates the P3 white point 594.

Figure 6:
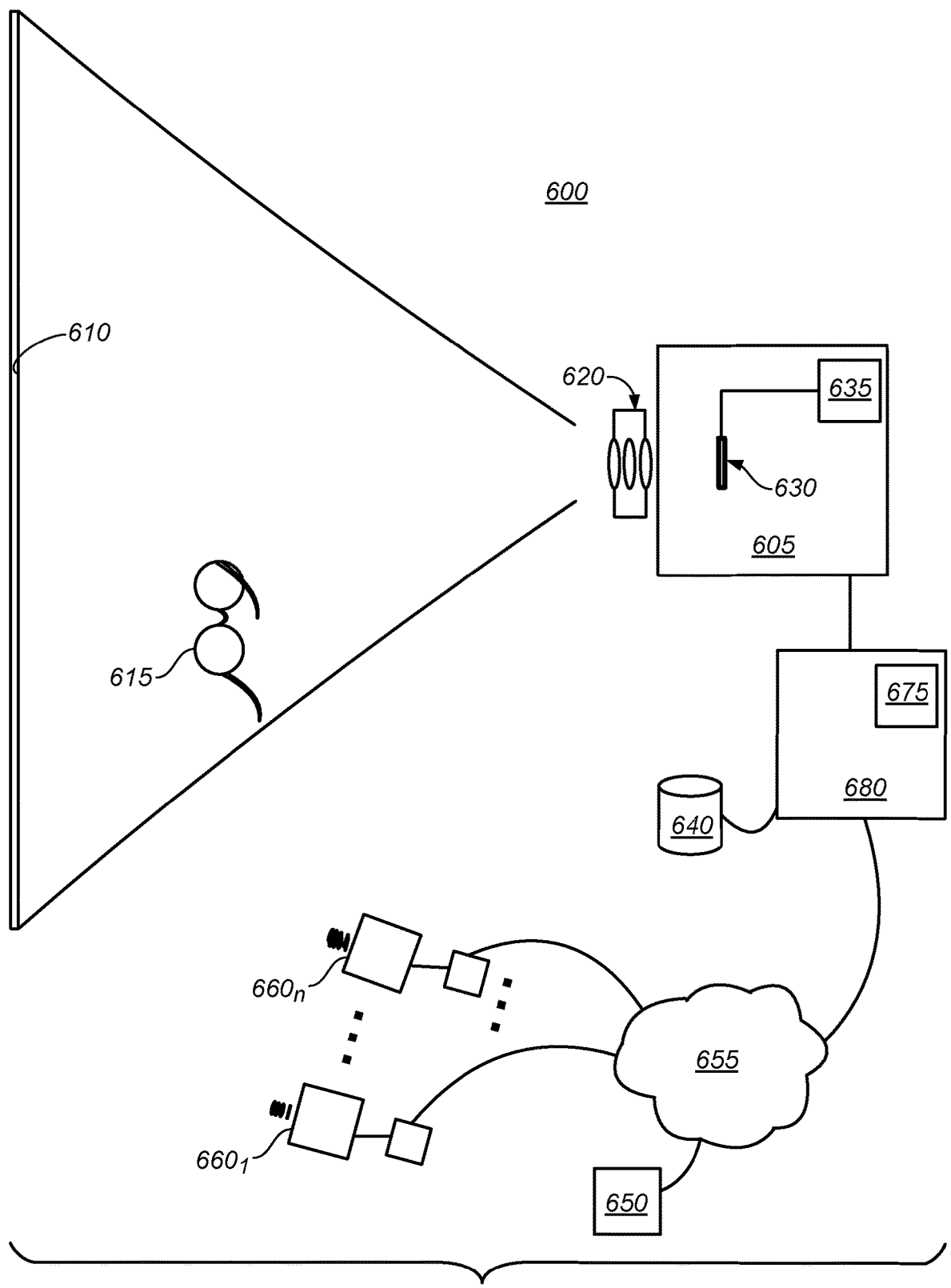
FIG. 6 is a drawing illustrating a projector, connectivity, cinema theater, and viewing arrangement according to embodiments of the present invention.

FIG. 6 is a drawing illustrating a projector, connectivity, cinema theater, and viewing arrangement of a projection system 600 according to embodiments of the present invention. The projection system 600 includes a digital cinema laser projector 605 that projects spectrally separated 3D images (a left channel image and a right channel image) modulated by modulator 630 and projected by projection lens 620 onto a screen 610 for viewing with glasses 615. Glasses 615 include, for example, spectrally separated filters disposed as coatings on each lens of the glasses such that the right lens comprises a filter that matches or encompasses the passbands of the right channel filter and the left lens comprises a filter that matches or encompasses passbands of the left channel filter (each of the left and right channel images are intended to be viewed by a viewer's corresponding left or right eye through the corresponding left or right eye lens/filter of the glasses) that are configured to pass laser lights. In various embodiments, the laser lights are passed at blue ends of passbands for each light and the passbands include a shifting passband for viewing the lights off-axis.

The filters are constructed, for example, via layered materials, films, and/or deposits, and may be disposed on a substrate. The layered materials may comprise layers that alternate between a layer of a relatively high index of refraction and a layer of relatively lower index of fraction. The thickness of the layers may also vary. The substrate, if applicable, may be glass, plastic, a polycarbonate, or another material. The substrate may be one of the layers. In one embodiment, the filter is a layered polycarbonate, plastic, or plastic like material without an underlying substrate material. In one embodiment, the filter is produced using a process that manufactures a plastic or plastic like material and then stretches the material to alter passband characteristics on portions of the material.

Compensation for blue-shifting may be further achieved via filter design. In one embodiment, the properties of the filter vary according to location on the glasses. For example, filters installed in eyeglasses are specifically designed such that the passband's are red-shifted toward the edges of the filters (e.g., red-shifted toward edges of the "lenses"). Accordingly, off-axis viewing, which more likely occurs at edges of the lenses, will be viewed through portions of the lenses/filters that have filter properties that are red-shifted compared to a central area of the lenses such that when viewed off-axis have similar spectral characteristics to the center of the lens when viewed on-axis. In such cases, and in one embodiment, a tolerance passband of the filter passbands may be increased so that the edge-viewed off-axis lights still pass through the intended passband/area. In other embodiments, the tolerance passband includes enough bandwidth to compensate for red-shifted filter properties away from the central portion of the lenses/filters. In yet other embodiments, since most, if not all, lights viewed from edges of the filters is being viewed off-axis, additional compensation for the red-shifted filter characteristics is not necessary.

Still other embodiments include glasses with shaped filters (or lenses) that have, for example, a spherical and/or cylindrical shape. The filters (or lenses) may, for example, be pre-formed or held in a shapes by the glasses frames. With shaped glasses the need for off-axis bandwidth is reduced and guard band sizes could be increased.

Thus, in one embodiment, the invention comprises 3D viewing glasses comprising lenses configured as filters for passing a first channel projection through a first of the lenses and a second channel projection through a second of the lenses. The filters may, for example, comprise passbands specifically configured to pass individual lights of the projections through individual or grouped passbands of the filters/lenses. The filters may, for example, be further configured to pass the individual lights at a blue end of its corresponding passband. The filters may, for example, include passband properties that are red-shifted at edges of the filters/lenses. The filters may, for example, include compensation for red-shifted passbands at edges of the filters. Any one or more in any combination of the above may be utilized.

The lenses filters may be constructed of plastic, and varying properties of the filter at its center compared to its edges may be produced in part by stretching the plastic material. The stretching causes the filter properties to shift in areas that are stretched. The filter properties may also be altered according to location on the lens. The projector 605 may receive, for example, image data for projection from a server 680. 3D content may be provided to the server 680 from, for example, a disk drive 640. Alternatively, 3D content may be transmitted to projector 605 over a secure link of network 655 from, for example, an image warehouse or studio 650. Multiple other projectors (e.g., at theaters around the globe, 6601 . . . 660*n*) may also feed from similar network or other electronic or wireless connections including wireless networks, satellite transmission, or quality airwave broadcasts (e.g., High Definition, Wide Color Gamut, High Dynamic Range, or better broadcast).

The server 680 may include a color correction module 675 that performs mathematical transformations of color to be reproduced by the projector prior to image projection. The mathematical transformations utilize image data for each of the left and right channels and transform them into parameters consistent with the primary colors or passbands of the corresponding left or right channel filter. The mathematical transformation, or color corrections, adjust the hue of each image and maximize the available color space and match the color space and white point of projector 705 as closely as possible. The color corrected 3D content is transmitted to projector 605. The 3D content includes left and right channel images that switch at a rate fast enough that they blend into a single 3D image when viewed by a viewer through glasses 615.

Figure 7:
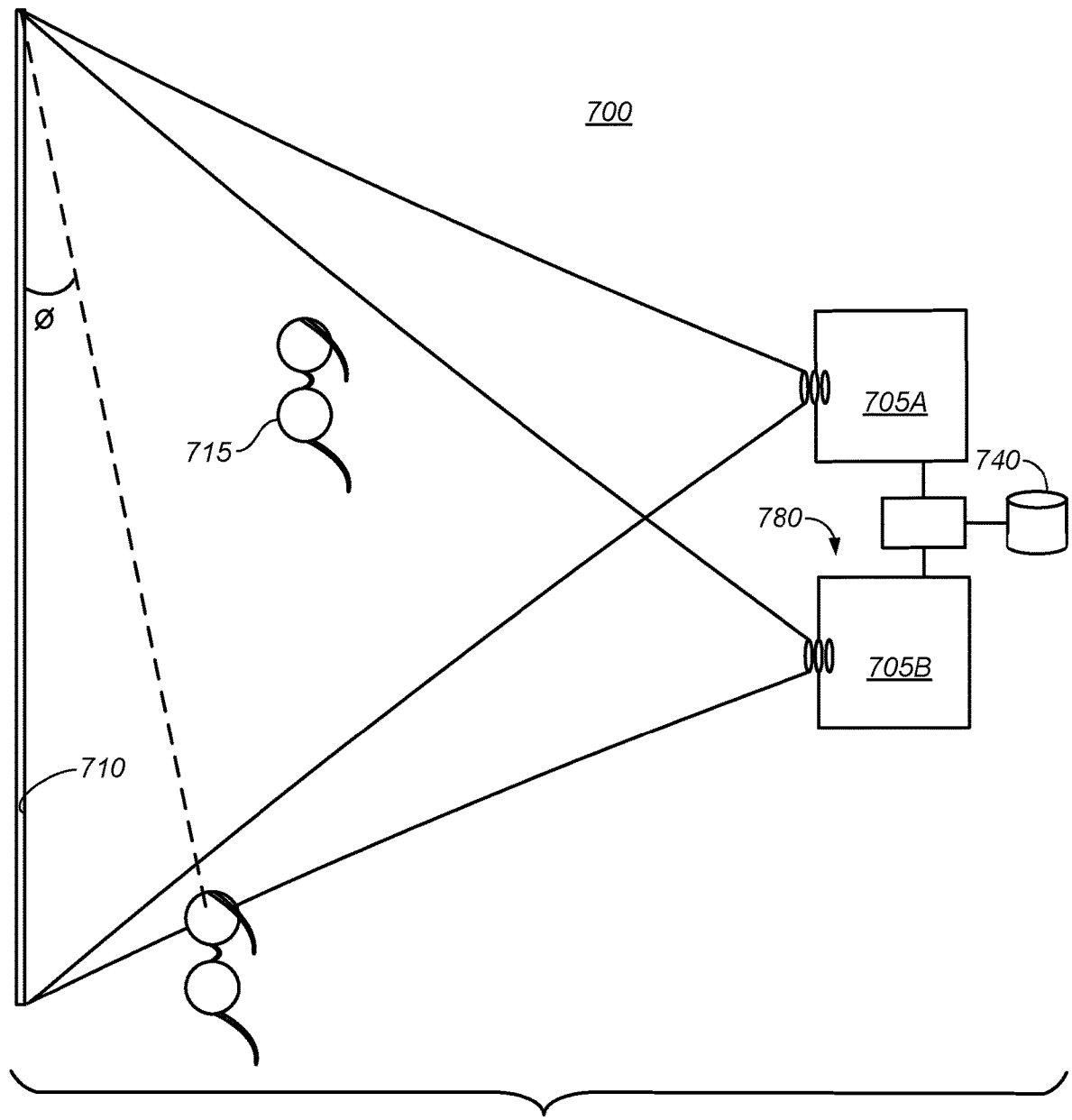
FIG. 7 is a drawing illustrating a dual projector arrangement according to embodiments of the present invention.

FIG. 7 is a drawing illustrating a dual projector arrangement 700 according to embodiments of the present invention. Left and right channel images are derived, decoded, retrieved, or reconstructed from data stored on disk drive 740 (or received from an appropriate network or transmission reception) by server 780. Color correction as described above may also be applied (not shown).

The decoded, color corrected (if applicable), left and right channel images are then projected simultaneously from left and right channel projectors 705A and 705B onto screen 710 for viewing through glasses 715. Projector 705A utilizes light sources (e.g., lasers) having wavelengths that, for example, match the light sources described by one of the previously described embodiments, e.g., 1st or 2nd channel illustrated in FIG. 5A or 4A. Projector 705B utilizes light sources having wavelengths complimentary to those in projector 705B (e.g., the corresponding channel lights of FIG. 5A or 4A, for example).

FIG. 7 also illustrates a viewer having glasses 716 located in a venue with viewing screen 710. The viewer is located, for example, at the end of a first row in the venue. When the viewer is facing forward, an image projected on screen 710 may be viewed through the glasses and corresponding filters in/on the glasses at an off-axis angle Ø. An amount of blueshift of the filters in the glasses may be calculated and used to determine an amount of shifting passband (or pass area) necessary for acceptable viewing. The embodiments described herein are specifically designed for a minimum viewing Ø of approximately 20 degrees.

Figure 8:
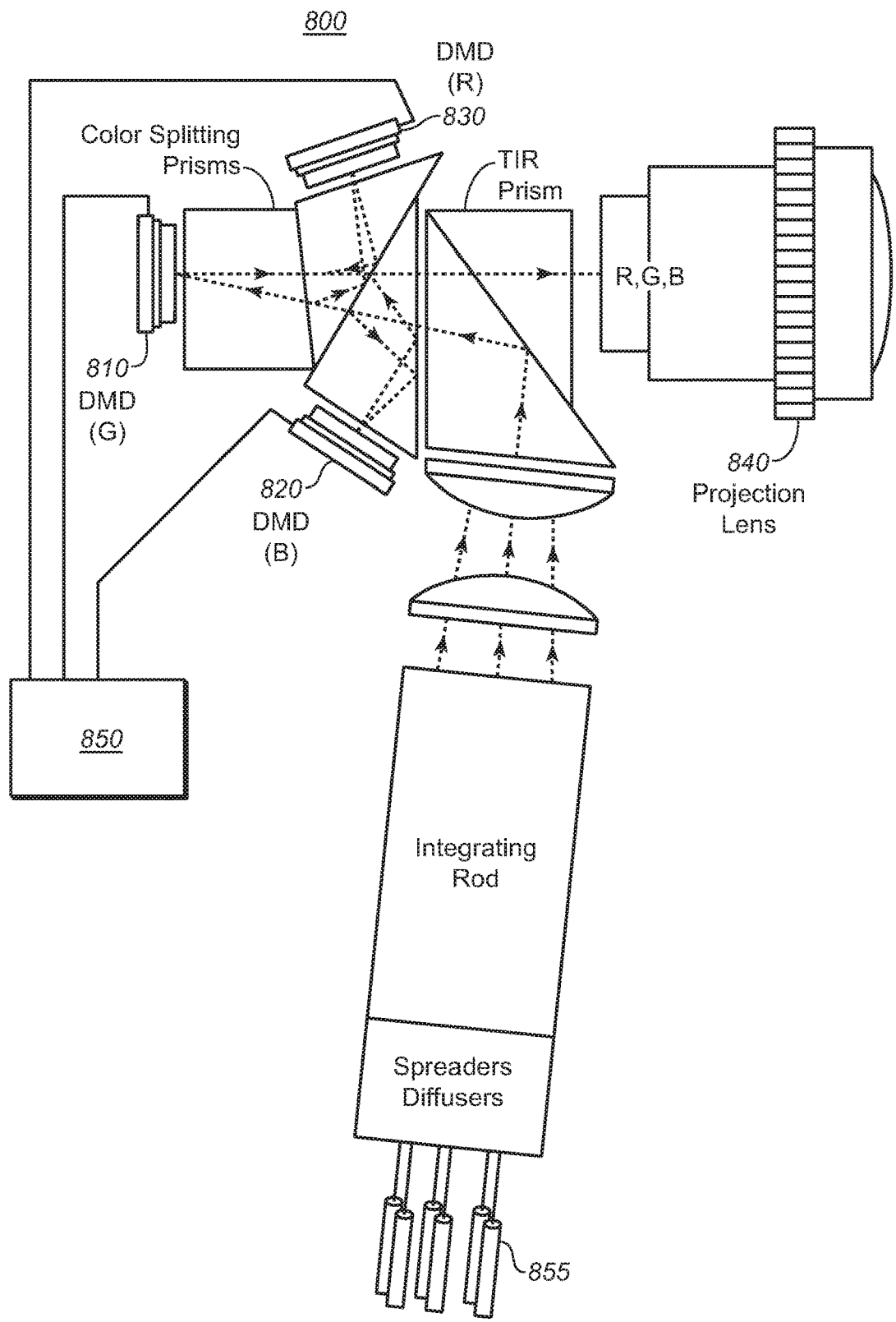
FIG. 8 is a drawing illustrating light sources and modulation for 3D projection or wide color gamut in 2D projections according to embodiments of the present invention.

FIG. 8 is a drawing illustrating light sources and modulation for 3D projection or wide color gamut in 2D projections according to embodiments of the present invention. A modulator 800 comprises a series of prisms that direct incoming light to an appropriate modulator (DMD modulators in this example) for modulation. In this example, modulator 800 utilizes a system of prisms 805 to direct green light to a "green" DMD modulator, blue light to a "blue" DMD modulator, and red light to a "red" DMD modulator. The prisms also function to re-combine the now modulated light and a projection lens 840 projects the modulated lights for display.

Each modulator is controlled, for example, by a processor 850 that includes programming to provide appropriate image data (including color correction from matching colors of left and right channel 3D images) to energize each of the DMD modulators.

A light source 855 comprises narrowband light sources. In the illustrated embodiment, the light sources comprise 6 laser light sources (2 red, 2 green, and 2 blue). For a 3D system, the light sources provide the ability to produce a first channel image having first spectral characteristics and a second channel image having second spectral characteristics complimentary to the first spectral characteristics (complimentary in the sense that the red, green, and blue wavelengths of the first channel are, for example, different/separate from the red, green, and blue wavelengths of the second channel).

For example, the light sources may alternate between illuminating the modulator 800 with RGB lights from the first channel and then with RGB lights from the second channel and so on. Processor 850 energizes the DMD modulators (separate "red," "green," and "blue" DMD's in the exemplary modulator 800) with image data corresponding to the first channel during time periods it is illuminated with the RGB lights for the first channel and then with image data corresponding to the second channel during time periods it is illuminated with RGB lights for the second channel.

The time periods for illumination may be at the frame level or at sub-frames (e.g., sub-frames corresponding to flash periods during a frame). In order to reduce the perceptibility of flicker, double or triple flash techniques are often used. In the double flash case, the image from each eye is projected twice during the frame. For example, the left eye image is projected for the first quarter of the frame, then the right eye image is projected for the second quarter of the frame, then the left eye image is projected again for the third quarter of the frame, and finally the right eye image is projected again for the last quarter of the frame. In this example, the modulators are illuminated with light corresponding to the left eye channel for the first quarter of the frame, then light corresponding to the right eye channel during the second quarter of the frame, then light corresponding to the left eye channel for the third quarter of the frame, and finally light corresponding to the right eye channel for the last quarter of the frame.

Triple flash operates similarly, but instead of twice per frame, the image for each eye is projected three times per frame. While higher-order flashing is possible, triple flash is typically sufficient to make flickering imperceptible in most cases. The invention includes the application of light for an image (left channel, right channel, or 2D image) synchronized with the energization of the modulators with corresponding image data.

In the 2D system cases, processor 850 is re-configured to energize the DMD modulators with 2D image data. That energization may occur across the entire frame or during flash periods of each frame. The modulators may be illuminated from all six light sources at the same time. This increases brightness and the additional red green and blue color points expand the color gamut of the 2D image compared to a frame of the 3D image (which only utilized 3 color points in this example). Additional light sources may be provided to increase brightness and color gamut in 3D applications as well. Examples of utilizing the additional light sources for wider color gamut are provided, by PCT Patent Application Ser. No. PCT/US2010/043277 by Martin Richards, which is incorporated herein by reference in its entirety for all purposes. The invention includes the application of the teachings in D09011 to any of the architectures, structures, and/or processes discussed herein whether 2D, 3D, or any display type.

Figure 9:
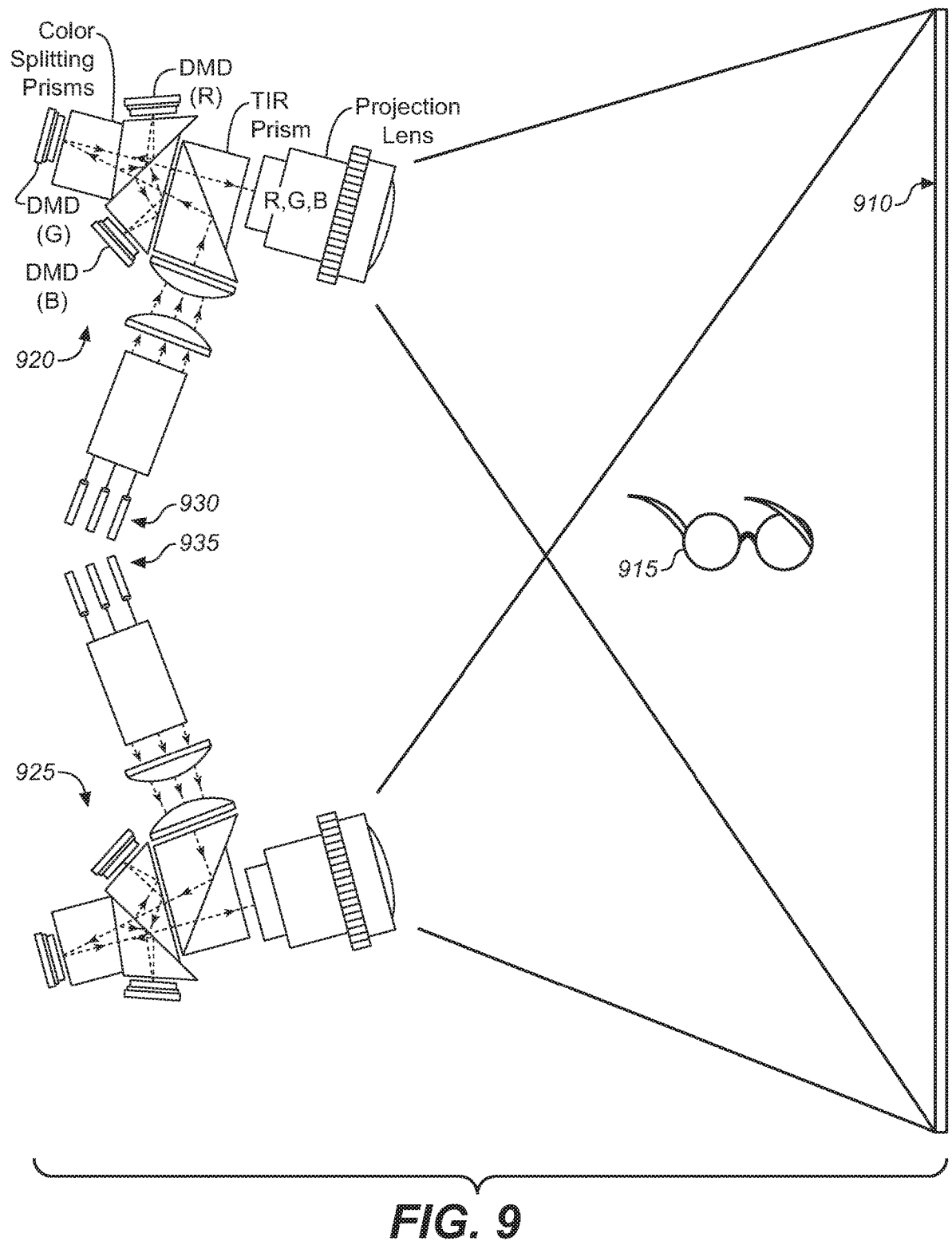
FIG. 9 is a drawing illustrating light sources and modulation in various dual projection systems according to embodiments of the present invention.

FIG. 9 is a drawing illustrating light sources and modulation in various dual projection systems according to embodiments of the present invention. Projectors 920 and 925 may be configured to simultaneously project 2D images or different channels of a 3D image. Projector 920 includes RGB laser light sources 930 and projector 925 includes RGB laser light sources 935. For 3D operation the individual lights of light sources 930 and 935 are complementary. Each are shown with 3 light sources (e.g., R, G, and B), but each projector may include additional light sources for increased brightness, color gamut, or both. Glasses 915 include filters specifically adapted to pass the wavelengths projected by projectors 920 and 925, and passbands of the filters are specifically formed at wavelengths to pass the individual lights in the projected images at blue ends of each passband and including a shifting passband to allow for off-axis viewing.

For 2D operation the individual lights may be of the same wavelengths for increased brightness, or they may be varied across the two projectors. In the case of varied wavelengths, processing of image data for energizing each DMD modulator tailored to the different wavelengths illuminating each modulator is performed. Again, the invention includes the application of the teachings in D09011 which provides examples that may be applied.

Although the present invention has been described herein with reference to DMD modulators and laser light sources, the devices and processes of the present invention may be applied to other types of projectors LCoS, DLP, etc., and light sources (e.g., wide band light sources with filters, LED light sources, nanotube based light sources, etc.).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a laser, any other equivalent device, or other device having an equivalent function or capability, whether or not listed herein, may be substituted therewith. As another example, the use of the term projector or projections should be broadly construed and include projection in the classical sense (as in a movie projector) and any improvements thereon, and projector may also encompass projections such as illumination of an LCD panel or other modulator, display screen, etc. Furthermore, the inventors recognize that newly developed technologies not now known may also be substituted for the described parts and still not depart from the scope of the present invention. All other described items, including, but not limited to light sources, lasers, modulators, processors, filter technologies including layering depositions, chemical processes, plastic manufacturing, etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, processing image data, color correcting image data, controlling illumination levels of various colors, synchronizing or switching projectors in multiple projector systems (e.g., dual projectors, triple or quad projector configurations), and the display, storage, or communication of results according to the processes of the present invention.

Various embodiments of the present invention may relate to one or more of the Enumerated Example Embodiments (EEEs) below, each of which are examples, and, as with any other related discussion provided above, should not be construed as limiting any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.). Examples:

Enumerated Example Embodiment 1 (EEE1). A 3D projection system, comprising a first set of narrowband light sources; a second set of narrowband light sources; and a projector configured to, modulate light from the first set of narrowband light sources to produce a first eye channel image of a 3D image, modulate light from the second set of narrowband light sources to produce a second eye channel image of the 3D image, and project the first eye channel image and the second eye channel image for display to a viewer.

EEE2. The 3D projection system according to EEE1, further comprising viewing glasses having passbands wherein light from at least one narrowband light source is passed by each passband and a central wavelength of at least one of the narrowband light sources is blue-shifted compared to a central wavelength of its corresponding passband of the viewing glasses.

EEE3. The 3D projection system according to EEE1, further comprising viewing glasses having passbands wherein light from at least one narrowband light source is passed by each passband and a central wavelength of at least one of the narrowband light sources passed by each passband is blue-shifted compared to a central wavelength of the passband.

EEE4. The 3D projection system according to EEE1, wherein the first narrow band light sources each comprise wavelengths interspersed with wavelengths of the second narrowband light sources and passed at a blue end of corresponding passbands of viewing filters.

EEE5. The 3D projection system according to EEE1, further comprising viewing glasses configured to have passbands corresponding to each of the narrowband light sources, wherein a central wavelength of each passband is red shifted compared to the wavelengths of its corresponding light source.

EEE6. The 3D projection system according to EEE1, wherein the narrowband light sources are laser light sources that are pre-blue shifted compared to passbands of viewing filters configured to separate the first and second eye channels for viewing by the viewer.

EEE7. 3D viewing glasses comprising passbands each configured to pass a corresponding set of projected narrowband wavelengths when viewed normally and when viewed off-axis.

EEE8. The 3D viewing glasses according to EEE7, wherein the passbands are configured to pass wavelengths viewed off-axis by an amount that approximates an oblique viewing angle in a cinema theater.

EEE9. The 3D viewing glasses according to EEE7, wherein the passbands are configured to pass wavelengths viewed not more than a predetermined angle off-axis.

EEE10. The 3D viewing glasses according to EEE9, wherein the predetermined angle is approximately 25 degrees.

EEE11. The 3D viewing glasses according to EEE7, wherein a central wavelength of each set of projected narrowband wavelengths is blue-shifted compared to a central wavelength passed by its corresponding passband.

EEE12. The 3D viewing glasses according to EEE7, wherein a central wavelength of each passband is red-shifted compared to a central wavelength of its corresponding set of projected narrowband wavelengths.

EEE13. The 3D viewing glasses according to EEE11, wherein a tolerance passband is provided between a bluest of the projected narrowband wavelengths in a passband and a blue end of the passband.

EEE14. The 3D viewing glasses according to Claim EEE13, wherein an amount of blueshift is approximately 2× a bandwidth of the tolerance passband.

EEE15. 3D viewing glasses according to Claim EEE14, wherein the tolerance passband has a bandwidth comprising a maximum deviation in tolerance of the projection system wavelengths.

EEE16. The 3D viewing glasses according to EEE7, wherein a tolerance passband is provided between a bluest of the projected narrowband wavelengths in a passband and a blue end of the passband.

EEE17. The 3D viewing glasses according to EEE16, wherein the tolerance passband is approximately equal to the maximum deviation of filter passband and laser production accuracy.

EEE18. 3D viewing glasses comprising passbands, wherein each passband comprises a narrowband passband intended to pass wavelengths matching a desired lightband, and an off-axis viewing passband, wherein the off-axis viewing passband comprises an area of the passband intended to pass the desired lightband when viewed under conditions causing the passband properties to shift due to off-axis viewing.

EEE19. The 3D viewing glasses according to Claim EEE18, wherein each passband further comprises a tolerance passband passing wavelengths bluer than the desired lightband.

EEE20. The 3D viewing glasses according to EEE19, wherein the tolerance passband is substantially less than the off-axis viewing passband.

EEE21. The 3D viewing glasses according to EEE19, wherein the tolerance passband is computed such that tolerance of the passbands/laser light production, do not cause light to be lost from the passbands.

EEE22. The 3D viewing glasses according to EEE19, wherein the tolerance passband comprises approximately ⅕th a bandwidth of the off-axis viewing passband.

EEE23. The 3D viewing glasses according to EEE19, wherein the tolerance passband bandwidth is a function of variability of accuracy and quality of the passbands and/or lightbands.

EEE24. The 3D viewing glasses according to EEE19, wherein the tolerance passband comprises a fractional amount of bandwidth compared to the off-axis viewing passband.

EEE25. The 3D viewing glasses according to EEE18, wherein the passbands comprise a first set of 4 passbands respectively intended to pass at least 6 sets of narrowband lights.

EEE26. The 3D viewing glasses according to EEE18, wherein the passbands are constructed from glass with layers disposed thereon, and wherein the wavelength properties change according to location on the lenses.

EEE27. The 3D viewing glasses according to EEE18, wherein off-axis viewing passband is intended to pass the desired lightband when viewed off-axis at approximately 25 degrees.

EEE28. The 3D viewing glasses according to EEE27, wherein the off-axis passband is reduced by an amount of curvature of the filters.

EEE29. The 3D viewing glasses according to EEE18, wherein the glasses lenses are a plastic or plastic-like material, altering the passband properties of the glasses in a central area in comparison to the edges.

EEE30. The 3D viewing glasses according to EEE18, wherein the glasses lenses are a plastic or plastic-like material, and the plastic material is stretched to alter the passband properties of the glasses in a central area in comparison to the edges of the material.

EEE31. The 3D viewing glasses according to EEE18, wherein the filters are disposed on arc shaped lenses of the glasses.

EEE32. The 3D viewing glasses according to EEE18, wherein the filters are in an arc by a frame of the glasses.

EEE33. The 3D viewing glasses according to EEE18, wherein the filters are held in a cylindrical curve by the glasses.

EEE34. The 3D viewing glasses according to EEE18, wherein the filters are disposed on cylindrically curved lenses of the glasses.

EEE35. The 3D viewing glasses according to EEE18, wherein at least one passband passes wavelengths of multiple desired lightbands.

EEE36. The 3D viewing glasses according to claim 16, wherein at least one passband encompasses a desired lightband and a second desired lightband, and 2 off-axis viewing passbands, wherein a first of the off-axis viewing passbands comprises a passband "redder" than the first desired lightband and "bluer" than the second desired lightband, and a second of the off-axis viewing passbands is "redder" than both the first and second desired lightbands.

EEE37. The 3D viewing glasses according to EEE36, wherein the first off-axis viewing passband passes more wavelengths than the second off-axis viewing passband.

EEE38. The 3D viewing glasses according to EEE37, wherein the passband encompassing the desired lightband and second desired light band is part of a first filter in the glasses and are surrounded by a red high pass passband and a green passband in a second filter of the glasses.

EEE39. The 3D viewing glasses according to EEE36, wherein the desired lightbands provide a color space approximately equivalent to that illustrated in FIGS. 4B and 5B.

EEE40. The 3D viewing glasses according to EEE18, wherein at least 3 desired lightbands are passed by each filter using only 2 passbands.

EEE41. Glasses comprising lenses having passbands each configured to pass at least one desired lightband off center in the passband when viewed normally and such that off-axis viewing initially "moves" the filter so that the desired lightband is passed closer to passband center.

EEE41B. The glasses according to EEE41 wherein off-axis viewing moves toward and then past center of the passband with increased angles of off-axis viewing.

EEE41C. Glasses comprising lenses having passbands each configured to pass at least one desired lightband off center in the passband when viewed normally and such that off-axis viewing initially "moves" the filter so as to pass the desired lightband further from center of the passband.

EEE41D. Glasses comprising lenses having at least one passband configured to, (a) pass a first desired lightband off center in the passband when viewed normally and such that off-axis viewing initially "moves" the filter so as to pass the first desired lightband closer to center of the passband, and pass a second desired lightband off center in the passband when viewed normally and such that off-axis viewing initially "moves" the filter so as to pass the second desired lightband further off center in the passband.

EEE41E. The glasses according to EEE41 D wherein off-axis viewing moves the filter such that the first desired lightband is first passed toward and then past center of the passband with increased angles of off-axis viewing and the second desired passband is passed still further from center with all increases in angle of off-axis viewing.

EEE41F. The Glasses according to EEE41, wherein the desired lightbands comprise a "blue" of center lightband and a "red" of center lightband.

EEE42. The Glasses according to EEE41, wherein each lens comprises 2 passbands configured to pass at least 3 narrowband lights.

EEE43. The Glasses according to EEE42, wherein the narrowband lights are modulated laser lights.

EEE44. The Glasses according to EEE42, wherein the narrowband lights comprise portions of a 3D image.

EEE45. The Glasses according to EEE42, wherein a first of the lenses comprises a blue passband and a green-red passband, and a second of the lenses comprises a blue-green passband and a red passband.

EEE46. The Glasses according to EEE45, wherein the red passband comprises a high pass filter.

EEE47. 3D Glasses, comprising a set of passbands each configured to pass one corresponding desired lightband, wherein the passbands are redshifted compared to their corresponding desired lightbands (i.e., the central wavelengths of the passbands are redder than their corresponding desired lightbands).

EEE48. A filter having passbands configured to pass desired narrowband lightbands in "bluer" wavelength areas of the passbands when viewed normally, and off-axis viewing shifts the passbands such that the desired lightbands are viewed in "redder" areas of the passbands.

EEE49. The filter according to EEE48, wherein the filter is intended to be used in viewing a left or right image of a 3D image.

EEE50. The filter according to EEE48, wherein the filter is mounted in a lens position of viewing glasses.

EEE51. Viewing glasses, comprising a left eye filter configured to pass light wavelengths corresponding to a left eye channel of a 3D image, and a right eye filter configured to pass light wavelengths corresponding to a right eye channel of a 3D image, wherein the filters each comprise a set of passbands, each passband respectively corresponding to and configured to pass at least one desired narrowband light; and a central wavelength passed by each passband is offset red compared to an average wavelength of its corresponding desired lightband(s).

EEE52. The viewing glasses according to EEE51, wherein each desired lightband comprises a narrow lightband.

EEE53. The viewing glasses according to Claim EEE51, wherein each desired lightband comprises laser light.

EEE54. The viewing glasses according to Claim EEE51, wherein each desired light band originates with a laser light source.

EEE55. The viewing glasses according to EEE51, wherein each desired light band originates with a separate light source.

EEE56. The viewing glasses according to Claim EEE51, wherein the filters on each lens comprise at least one blue only filter or at least one red only filter.

EEE57. The viewing glasses according to EEE51, wherein the filters on each lens comprise only one blue only filter or only one red only filter.

EEE58. The viewing glasses according to EEE51, wherein the filters on each lens comprise only one blue only filter and no red only filters or only one red only filter and no blue only filters.

EEE59. The viewing glasses according to EEE51, wherein the filters on each lens comprise at least one blue filter or at least one red filter, and a filter comprising two other primary colors.

EEE60. The viewing glasses according to claim 1, wherein each of the filters comprise at least one single color passband and at least one two color passband each passband including a portion of the passband dedicated to normal axis viewing of wavelengths corresponding to its channel and an off-axis viewing portion dedicated to off-axis viewing of wavelengths corresponding to its channel.

EEE61. The viewing glasses according to EEE60, wherein a "bluest" of the filters for one of the channels is configured to pass at least two desired lightbands separated by at least one off-axis viewing portion.

EEE62. The viewing glasses according to EEE61, wherein the "bluest" of the filters for one of the channels is "surrounded" by a blue only passband and a green-red passband of the other channel.

EEE63. The viewing glasses according to EEE60, wherein a "reddest" of the filters for one of the channels is configured to pass at least two desired lightbands separated by at least one off-axis viewing portion.

EEE64. 3D viewing glasses comprising a first eye filter comprising passbands for passing primary color lights, wherein each passband comprises a passband portion for viewing narrowband light normally and an off-axis passband portion configured for viewing the narrowband light off-axis.

EEE65. The 3D viewing glasses according to EEE64, wherein the off-axis passband portion is wide enough to pass off-axis viewing of the narrowband light at a predetermined angle.

EEE66. The 3D viewing glasses according to EEE65, wherein the predetermined off-axis viewing angle is approximately 25 degrees.

EEE67. The 3D viewing glasses according to EEE65, wherein the off-axis passband passes longer wavelengths than the passband configured to pass the narrowband light normally.

EEE68. The 3D viewing glasses according to EEE65, further comprising a tolerance passband approximately ⅕ in size compared to the off-axis passband and passing shorter wavelengths than the passband configured to pass the narrowband light normally.

EEE69. 3D viewing glasses comprising a first eye filter comprising passbands for passing primary color lights and having a passband comprising an open end and a closed end configured to pass a narrowband light wherein the passband includes a tolerance passband and a shift passband having at least 5× the bandwidth of the tolerance passband.

EEE70. The 3D viewing glasses according to EEE69, further comprising a second eye filter configured to pass primary lights including a second passband having an open end and a closed end.

EEE71. The 3D viewing glasses according to EEE70, wherein the second passband is at an opposite spectral end compared to the first passband.

EEE72. The 3D viewing filter according to EEE70, wherein the second passband is in blue wavelengths and the first passband is in red wavelengths.

EEE73. 3D viewing glasses comprising a viewing filter comprising passbands for passing primary color lights and having a passband comprising an open end and a closed end configured to pass a narrowband light wherein the passband includes a tolerance passband and a shift passband, the shift passband comprising a bandwidth approximately equal to an amount of blueshift that occurs when viewing at a predetermined angle.

EEE74. The 3D viewing glasses according to EEE73, wherein the predetermined angle comprises a maximum oblique angle of viewing through the glasses when viewing a cinema screen.

EEE75. The 3D viewing glasses according to EEE73, wherein the predetermined angle comprises an average oblique angle of viewing by an average cinema theater viewer when seated at the end of a seat row in the theater.

EEE76. The 3D viewing glasses according to EEE73, wherein the predetermined angle comprises an average oblique angle of viewing by a cinema theater viewer when facing one direction and viewing an image projected with the primary color lights in another direction through the glasses.

EEE77. 3D viewing glasses comprising at least two passbands, including a first passband having an open end and a closed end, and second passband having an open end and a closed end.

EEE78. The 3D viewing glasses according to EEE77, wherein the first and second passbands are on different filters of the glasses.

EEE79. The 3D viewing glasses according to EEE77, wherein the first and second passbands are at opposite spectral locations.

EEE80. The 3D viewing glasses according to EEE79, wherein the first and second passbands are on a same filter of the glasses.

EEE81. The 3D viewing glasses according to EEE77, wherein the first passband comprises a tolerance band, at the closed end of the first passband.

EEE82. The 3D viewing glasses according to EEE77, wherein the second passband comprises a shifting passband, at the closed end of the second passband, only intended to pass primary light viewed at off-perpendicular angles through the glasses.

EEE83. The 3D viewing glasses according to EEE77, wherein the first passband comprises a tolerance passband at the closed end of the first passband and the second passband comprises a shifting passband at the closed end of the second passband.

EEE84. 3D glasses comprising a first eye lens comprising a first pass filter at an end of visible wavelengths, and a second eye lens comprising a second pass filter at an opposite end of visible wavelengths.

EEE85. The 3D glasses according to EEE84, wherein one of the pass filters comprises a shifting pass area from a wavelength intended to be passed by the filter at a normal viewing angle and a closed end of the pass filter.

EEE86. The 3D glasses according to EEE84, wherein one of the pass filters comprises a shifting pass area from a wavelength intended to be passed by the filter and continuing without visible pass limit toward the end of the visible spectrum.

EEE87. The 3D glasses according to EE84, wherein the first eye lens and second eye lens each further comprise an additional passband configured to pass green light.

EEE87B. The 3D glasses according to any of EEE84-EEE87 wherein properties of the filters vary according to location on the filter.

EEE87C. The 3D glasses according to any of EEE84-EEE87B wherein properties of the filters vary according to location of the filter such that filter properties are red shifted at edges of each lens compared to a central area of the lens.

EEE88. A 3D filter material comprising a high pass filter in red wavelengths, and a low pass filter in blue wavelengths.

EEE89. The 3D filter material of EEE88, further comprising a bandpass filter in green wavelengths.

EEE90. The 3D filter material of EEE88, wherein the open ended low pass filter is specifically configured to pass a narrow band blue light with a shifting pass area beginning at a wavelength of a "red wall" of the filter and continuing to the wavelength of the narrow band blue light.

EEE91. The 3D filter material of EEE88, wherein the filter material is part of a filter material set comprising a second filter material comprising one of, a blue-green passband and a red passband, and a green-red passband and a blue passband.

EEE92. The 3D filter material according to EEE88, further comprising a green passband.

EEE93. The 3D filter material according to EEE88, wherein the open ended high pass filter is specifically configured to utilize the open ended portion of the high pass filter passing wavelengths higher than a wavelength intended to be passed by the open ended high pass filter as a shifting pass area.

EEE94. The 3D filter material according to any of EEE90 and EEE93, wherein the shifting pass area is sufficient to pass off-axis viewed lights at a predetermined angle.

EEE95. The 3D filter material according to EEE94, wherein the predetermined angle comprises an angle of approximately 25 degrees.

EEE96. The 3D filter material according to EEE94, wherein the predetermined angle comprises one of a maximum off-axis viewing angle for typical viewing styles, an average off-axis viewing angle, and an acceptable off-axis viewing angle at a venue.

EEE97. The 3D filter material according to EEE94, wherein the predetermined angle comprises a trade-off between available spectrum for shifting pass areas and off-axis viewing quality such that given the number of passbands and guard band sizes to prevent crosstalk between 3D channels, the filter material provides the maximum off-axis viewing capability and colorspace.

EEE98. The 3D filter material according to any of EEE88-EEE97 wherein properties of the filter material vary according to location on the filter.

EEE99. 3D filters comprising at least one passband configured to pass two desired lightbands and constructed to have a tolerance band between a blue end of the passband and a bluest of the desired lightbands, a shifting passband between the reddest of the desired lightbands and a reddest end of the passband, wherein the shifting passband has a larger bandwidth than the tolerance passband.

EEE100. The 3D filters according to EEE99, wherein the shifting passband and the tolerance passband have approximately a 5:1 bandwidth ratio.

EEE101. The 3D filters according to EEE99, wherein the desired lightbands passed by the at least one passband are different colors.

EEE102. Filters configured to pass at least one desired lightband in a pass area including a normal pass area and a shifting area, wherein the filters are further configured to pass the desired light band in the normal pass area when passing the desired light band at a normal angle of incidence, and pass the desired lightband in increasingly "redder" portions of the shifting area at increased off-normal angles of incidence; and wherein the normal pass area comprises shorter wavelengths than the shifting pass area.

EEE103. Filters configured to pass at least one desired lightband in a pass area including a normal pass area and a shifting area, wherein the filters are further configured to pass the desired light band in the normal pass area when passing the desired light band at a normal angle of incidence, and pass the desired lightband in increasingly "redder" portions of the shifting area at increased off-normal angles of incidence; and wherein the normal pass area has a smaller bandwidth than the shifting pass area.

EEE104. Filters configured to pass at least one desired lightband in a pass area including a normal pass area and a shifting area, wherein the filters are further configured to pass the desired light band in the normal pass area when passing the desired light band at a normal angle of incidence, and pass the desired lightband in increasingly "redder" portions of the shifting area at increased off-normal angles of incidence; and wherein the normal pass area is "bluer" and off-center compared to the combined normal pass and shifting pass areas.

EEE102. Filters configured to,
pass a first desired lightband in a first pass area including a first normal pass area, a first shifting pass area, and a first tolerance pass area; and
pass a second desired lightband in a second pass area including a second normal pass area, a second shifting pass area, and a second tolerance pass area;
wherein:
the filters are further configured to pass the desired lightbands in their corresponding normal pass area when passing the desired lightbands at a normal angle of incidence, and pass the desired lightbands in increasingly "redder" portions of the shifting area at increased off-normal angles of incidence; and
the normal pass areas comprise shorter wavelengths than their corresponding shifting pass areas.

EEE103. Filters configured to,
pass a first desired lightband in a first pass area including a first normal pass area, a first shifting pass area, and a first tolerance pass area; and
pass a second desired lightband in a second pass area including a second normal pass area, a second shifting pass area, and a second tolerance pass area;
wherein:
the filters are further configured to pass the desired lightbands in their corresponding normal pass area when passing the desired lightbands at a normal angle of incidence, and pass the desired lightbands in increasingly "redder" portions of the shifting area at increased off-normal angles of incidence; and
the shifting pass area of a shorter wavelength of the desired lightbands subsumes the tolerance pass area of a longer wavelength desired light band.

EEE104. Filters configured to,
pass a first desired lightband in a first pass area including a first normal pass area, a first shifting pass area, and a first tolerance pass area; and
pass a second desired lightband in a second pass area including a second normal pass area, a second shifting pass area, and a second tolerance pass area;
wherein:
the filters are further configured to pass the desired lightbands in their corresponding normal pass area when passing the desired lightbands at a normal angle of incidence, and pass the desired lightbands in increasingly "redder" portions of the shifting area at increased off-normal angles of incidence; and
the tolerance pass area of a higher wavelength desired light band subsumes at least a portion of the shifting pass area of a shorter wavelength desired light band.

EEE105. Filters configured to,
pass a first desired lightband in a first pass area including a first normal pass area, a first shifting pass area, and a first tolerance pass area; and
pass a second desired lightband in a second pass area including a second normal pass area, a second shifting pass area, and a second tolerance pass area;
wherein:
the filters are further configured to pass the desired lightbands in their corresponding normal pass area when passing the desired lightbands at a normal angle of incidence, and pass the desired lightbands in increasingly "redder" portions of the shifting area at increased off-normal angles of incidence; and
the normal pass area corresponding to each desired lightband is "off-center" compared to the combined tolerance, normal and shifting pass areas of the desired lightband.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed:

1. A display system configured to display 3D images comprising right and left images composed of spectrally separated lights, the display system comprising:
   an image rendering device; and
   3D viewing glasses comprising a left eye filter and a right eye filter, the left eye filter configured to transmit a set of at least one projected narrowband wavelength corresponding to a left view of a 3D image rendered by the image rendering device, the right eye filter configured to transmit a set of at least one projected narrowband wavelength corresponding to a right view of the 3D image rendered by the image rendering device, the filters configured to pass their corresponding set of at least one projected narrowband wavelength to a viewer when viewed through the glasses at normal angles and when viewed through the glasses at off-normal angles;
   wherein pass areas of the filters are constructed so that, when viewed normally, the projected narrowband wavelengths are transmitted at a shortest wavelength position of the passband that also provides a predetermined amount of transmission of the light through the passband.

2. The display system according to claim 1, wherein the sets of projected narrowband wavelengths are all transmitted at first positions relative to the spectral properties of their corresponding filters when viewed normally and, when viewed at increasingly off-normal angles, at least one of each of the sets of projected narrowband wavelengths are transmitted at positions that are increasingly further from the first positions and increasingly closer to long wavelength ends of the pass areas of the filters including areas of the filter that do not transmit any of the projected narrowband wavelengths when viewed normally.

3. The display system according to claim 1, wherein the filters comprise a tolerance pass area provided between a shortest of any narrowband wavelengths passed through a pass area of the filter when normally incident and a short wavelength end of the pass area.

4. The display system according to claim 3, wherein the filters comprise multiple tolerance pass areas each in different areas of the filter comprising a first tolerance pass area of a filter and a second tolerance pass area of the other filter, and wherein a bandwidth of the first tolerance pass area is different from a bandwidth of the second tolerance pass area.

5. The display system according to claim 3, wherein tolerance pass areas of one filter are larger than tolerance pass areas of the other filter.

6. The display system according to claim 3, wherein tolerance pass areas of a filter have different bandwidths.

7. The display system according to claim 1, wherein pass areas of the filters entirely surround all image carrying wavelengths of the images and pass wavelengths adjacent to the image carrying wavelengths when the wavelengths pass normally though the filters.

8. The display system according to claim 1, wherein pass areas of the filters entirely encompass all image carrying wavelengths of the images and wavelengths adjacent to image carrying wavelengths when the wavelengths are normally incident to the filters.

9. The display system according to claim 1, wherein pass areas of the filters entirely encompass all image carrying wavelengths of the display system and sets of non-image carrying wavelengths each set of non-image carrying wavelengths adjacent to at least one image carrying wavelength and a cut-off wavelength of a pass area of the filter.

10. The display system according to claim 1, wherein each pass area of the filters includes a shifting area that does not pass any image carrying wavelengths when the image carrying wavelengths are normally incident to the glasses.

11. The display system according to claim 1, wherein each pass area of the filters includes a shifting area that does not pass any image carrying wavelengths when the image carrying wavelengths are normally incident to the glasses, and, when incident at increasingly off-normal angles, a correspondingly increasing amount of the shifting area is utilized to pass image carrying wavelengths.

12. The display system according to claim 11, wherein the shifting areas of a filter comprise pass areas between a longest wavelength of a contiguous set of image carrying wavelengths and a cut-off wavelength of a pass area intended to pass the contiguous set of image carrying wavelengths when normally incident to the filter.

13. The display system according to claim 11, wherein the shifting areas comprise a majority of bandwidth within a pass area.

14. The display system according to claim 11, wherein the shifting areas comprise a majority of bandwidth within each pass area of a filter.

15. The display system according to claim 1, wherein the projected narrowband wavelengths are laser wavelengths.

16. 3D viewing glasses comprising a left eye filter and a right eye filter, the left eye filter configured to transmit sets of projected narrowband wavelengths corresponding to left views of a 3D images rendered by the image rendering device, the right eye filter configured to transmit sets of narrowband wavelengths corresponding to a right views of the 3D images rendered by the image rendering device, the filters configured to transmit their corresponding sets of projected narrowband wavelengths to a viewer when viewed through the glasses at normal angles of incident and when viewed through the glasses at off-normal angles of incident;
wherein the filters comprise a plurality of tolerance pass areas each provided between a shortest of any narrowband wavelength set passed through a pass area of a filter when normally incident and a short wavelength end of the pass area.

17. The 3D viewing glasses according to claim 16, wherein a longest wavelength of each set of projected narrowband wavelengths is transmitted at a first position within a pass area of its corresponding filter when viewed normally and, when viewed at increasingly off-normal angles, the longest wavelength is transmitted at increasingly further positions in a shifting area of the pass area and closer to a long wavelength end of the pass area, the shifting area comprising an area that does not transmit any of the image carrying wavelengths when viewed normally.

18. The 3D viewing glasses according to claim 16, wherein bandwidths of the tolerance pass areas are not all the same.

19. The 3D viewing glasses according to claim 16, wherein pass areas of the filters entirely encompass all image carrying wavelengths of the display system and sets of non-image carrying wavelengths each set of non-image carrying wavelengths adjacent to at least one image carrying wavelength and a cut-off wavelength of a pass area of the filter.

20. The 3D viewing glasses according to claim 16, wherein the shifting areas of a filter comprise pass areas between a longest wavelength of a contiguous set of image carrying wavelengths and a cut-off wavelength of a pass area intended to pass the contiguous set of image carrying wavelengths when normally incident to the filter.

* * * * *